United States Patent [19]

Clemmons et al.

[11] Patent Number: 4,544,047

[45] Date of Patent: Oct. 1, 1985

[54] SPRING-APPLIED, AIR-RELEASED, SLACK-ADJUSTING PARKING BRAKE

[75] Inventors: Quentin T. Clemmons, Irwin; Paul F. Czerniewski, Jeannette, both of Pa.

[73] Assignee: American Standard Inc., Wilmerding, Pa.

[21] Appl. No.: 474,217

[22] Filed: Mar. 10, 1983

Related U.S. Application Data

[63] Continuation-in-part of Ser. No. 185,060, Sep. 8, 1980.

[51] Int. Cl.[4] .............................................. F16D 65/24
[52] U.S. Cl. ....................................... 188/170; 92/62; 92/130 A; 188/196 D; 188/202
[58] Field of Search ................... 188/170, 196 D, 199, 188/202, 203, 153 R; 92/130 A, 62

[56] References Cited

U.S. PATENT DOCUMENTS

| | | | |
|---|---|---|---|
| 3,100,032 | 8/1963 | Larsson | 188/203 X |
| 3,101,219 | 8/1963 | Herrera | 92/63 X |
| 3,338,356 | 8/1967 | Sobol et al. | 188/203 S |
| 3,547,233 | 12/1970 | Girvon | 188/170 |
| 3,599,761 | 8/1971 | Schultz et al. | 188/170 |
| 3,633,715 | 1/1972 | Burnett | 188/170 |
| 3,704,653 | 12/1972 | Higgins | 188/170 X |
| 3,777,857 | 12/1973 | Hughes | 188/170 |
| 4,186,649 | 2/1980 | Sundstrom | 92/62 X |

FOREIGN PATENT DOCUMENTS

| | | | |
|---|---|---|---|
| 1192338 | 5/1970 | United Kingdom | 188/203 |
| 1354631 | 5/1974 | United Kingdom | 188/170 |

*Primary Examiner*—George E. A. Halvosa
*Attorney, Agent, or Firm*—G. E. Hawranko

[57] ABSTRACT

A parking brake, primarily for use with railway vehicles, including a friction clutch associated with a fast-travel nut which is locked by the clutch against rotation on a threaded spindle connected to a brake head, under a force exerted by a plurality of stacked Belleville-type disc springs. The spring load may be overcome by air pressure acting on respective faces of a plurality of serially connected pistons, which, in effect releases the fast-travel nut for free spinning to thereby accommodate axial displacement of the spindle during normal service application and release of the brakes.

6 Claims, 3 Drawing Figures

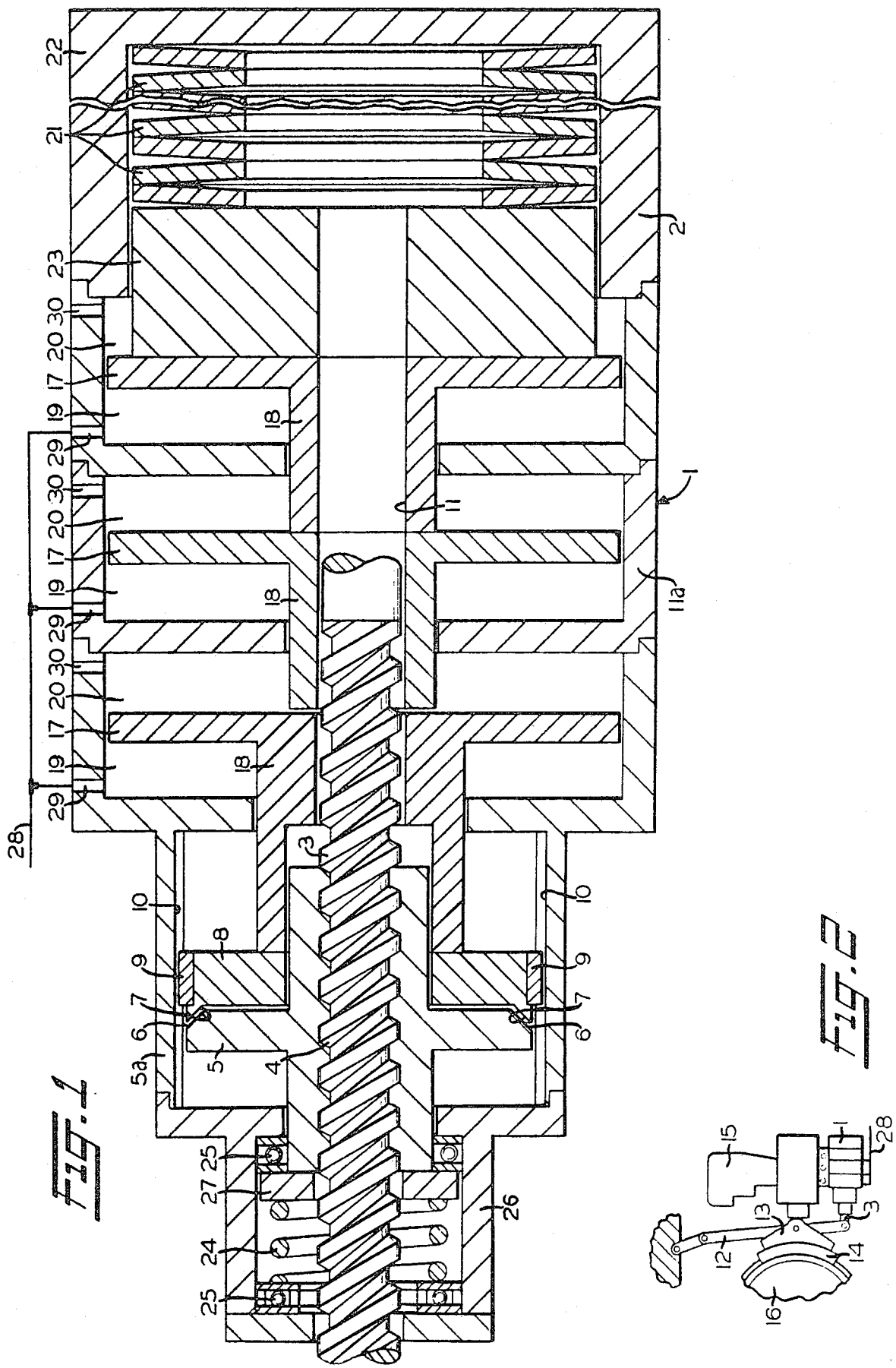

SPRING-APPLIED, AIR-RELEASED, SLACK-ADJUSTING PARKING BRAKE

BACKGROUND OF THE INVENTION

This is a continuation-in-part of copending application Ser. No. 185,060, filed on Sept. 8, 1980.

Some of the presently known parking brake devices have certain disadvantages which the present invention overcomes. One disadvantage of the presently known parking brake devices is that it is bulky and, along with control appendages, requires much space for mounting. Another disadvantage is that if fluid pressure required for applying the brake fails, there is no provision for braking action.

SUMMARY OF THE INVENTION

The object of the present invention is to provide a railway vehicle parking brake that requires a minimum of mounting space and that insures a braking application in the event of failure of fluid pressure.

Briefly, the invention comprises a parking brake cylinder compactly designed so that it may be mounted externally of a normal brake unit of the vehicle. A fast-travel nut carried by a threaded spindle, which is connected to a brake head, is locked against rotation under a force exerted by a plurality of stacked Belleville-type disc springs. The spring load may be overcome by parking brake control pressure acting on respective faces of a plurality of interconnected stacked pistons having a total effective pressure area equivalent to a single, large diameter piston, to thereby provide a compact cylinder design. In the release condition of the parking brake, that is, with spring force neutralized, the nut may spin freely to accommodate axial displacement of the spindle during normal service application and release of the brake shoe and to accommodate axial displacement resulting from brake shoe wear and/or thermal contraction. To apply the parking brake, the control pressure acting on the stacked piston is released so that the disc spring force actuates the clutch to lock up the fast-travel nut and thereby transmit the spring force, via the spindle, to the brake shoes.

BRIEF DESCRIPTION OF THE DRAWINGS

FIG. 1 is an elevational view, in section, of a parking brake device embodying the invention.

FIG. 2 is a schematic view, on a smaller scale than FIG. 1, showing the mounting arrangement of the braking device shown in FIG. 1.

DESCRIPTION AND OPERATION

Figure 3:
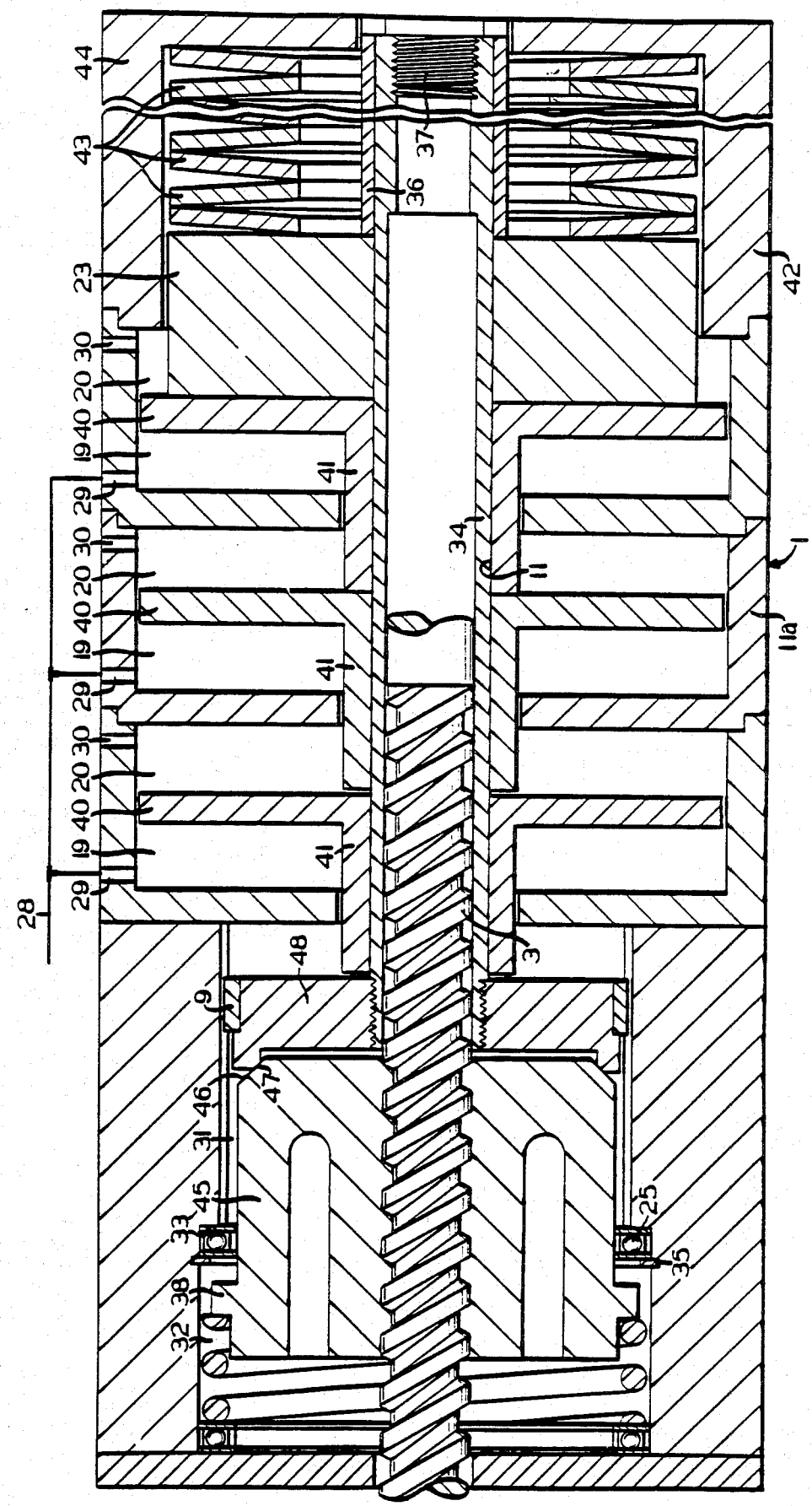
FIG. 3 is an elevational view in section of a parking brake device showing an alternate embodiment of the invention.

As shown in FIG. 1, a parking brake device 1 embodying the invention comprises a cylindrical housing 2 in which a non-rotating, but axially movable spindle 3 is coaxially disposed. Spindle 3 is provided with fast-pitch screw threads 4 for carrying a fast-travel nut 5 disposed in a clutch housing portion 5a, said nut having a conical clutch surface 6 engageable with a complementary clutch surface 7 formed on an adjacent clutch seat member 8. Clutch seat member 8 is provided with oppositely disposed keys 9 which ride in respective slots 10 formed on the inner surface of cylindrical housing 2 to permit axial movement of the clutch seat member, as will hereinafter be explained.

One end of spindle 3 is slidably disposed in a coaxial bore 11 formed in a piston housing portion 11a of housing 2 while the other end is pivotally secured to a brake lever 12 (see FIG. 2) of a brake head 13 for exerting or releasing a braking force on a brake shoe 14 connected to a tread brake unit 15 for applying braking force on a wheel 16. Parking brake device 1, as shown in FIG. 2, is supported exteriorly of, by and underneath tread brake unit 15.

A plurality of stacked pistons 17 is disposed coaxially in piston housing portion 11a, each piston having a hollow hub portion 18 arranged in serially abutting contact so as to form, in effect, a push rod in which bore 11 is formed. The purpose of the plurality of stacked pistons 17 is to minimize the diametral dimension of the parking brake device without reducing the effective piston pressure area. Each of the pistons 17 has a pressure chamber 19 formed adjacent the left side thereof and a vent chamber 20 formed adjacent the right side thereof, as viewed in FIG. 1.

A plurality of stacked Belleville-type disc springs 21 is disposed coaxially in a spring housing portion 22 formed at the right-hand end of housing 2, as viewed in FIG. 1. Springs 21 are compressibly disposed between a right-hand end wall of housing portion 22 and an annular spring seat member 23 which is disposed between the right-hand end of stacked pistons 17 and the left-hand end of said springs.

A spring 24 is compressibly disposed between a pair of axially spaced-apart thrust bearings 25 in a thrust-bearing housing portion 26 at the left-hand end of housing 2. When the left-hand end of fast-travel nut 5 is bearing against an annular stop member 27, against which spring 24 rests, said nut is prevented from moving leftwardly with spindle 3. Free rotation of nut 5 during brake applications (leftward movement of spindle 3), thus assures automatic slack adjusting action, as the brake shoe 14 wears, since spindle 3 is free to move axially with said brake shoe by screw action with said nut until engagement of the shoe with wheel 16 occurs.

A controlled fluid pressure supply conduit 28 is connected to each of the pressure chambers 19 via respective supply ports 29. Vent chambers 20 are each vented to atmosphere via respective vent ports 30.

In operation, a parking brake application may be effected either independently of a service brake application or by locking up a service brake application when in effect. In either case, control pressure action on pistons 17 in pressure chambers 19 must be released to free and allow springs 21, acting through spring seat member 23, to urge said pistons in a leftwardly direction, as viewed in FIG. 1, to thereby force clutch seat member 8 into abutting contact with fast-travel nut 5. Clutch surfaces 6 and 7 are thus engaged, and nut 5 is locked against rotation on spindle 3. If a service brake application is in effect at the time, the clutch locking action on nut 5 allows the force of disc springs 21 to be transmitted through pistons 17, clutch seat member 8, and nut 5 to spindle 3, but without further axial displacement of the spindle since the brake shoe 14 is already in braking engagement with wheel 16. In the absence of a brake application at the time, spring 24 is sufficiently compressed to allow spindle 3 to move axially leftwardly, together with the locked-up nut 5, until shoe 14 is in contact with wheel 16. The effective parking brake force is provided in accordance with that generated by disc springs 21.

During normal service braking operations, disc springs 21 are held in a compressed state by pressure acting on the several pistons 17 which react against spring seat 23, so that nut 5 is free to spin, thereby accommodating reciprocable axial movement of spindle 3 during such service braking operation. This arrangement also provides a slack adjusting feature by maintaining zero clearance between brake shoe 14 and wheel 16.

With a parking brake application in effect, it should be appreciated that any increase in distance between brake shoe 14 and wheel 16 (due, perhaps, to thermal contraction of the wheel during cooling) is compensated for by action of disc springs 21 so that no loss of braking effect is experienced.

As shown in FIG. 3, a parking brake device 1 presenting an alternate embodiment of the invention is comprised of substantially the same elements as shown in FIG. 1, there being several alternate provisions as will hereinafter be detailed. The cylindrical housing 42, shown in FIG. 3, is constructed having a substantially uniform circumferential dimension over the length of the parking brake device 1. The front, or lefthandmost portion of the parking brake device 1, contains two concentric bores 31 and 32. The thrust bearing bore 32 is larger in diameter than the clutch housing bore 31 which, since the two bores 31, 32 are formed adjacent each other in the front portion, results in a thrust bearing shoulder 33 formed therebetween. The thrust bearing shoulder 33 serves to contain the spring 24 and the thrust bearings 25 within the thrust bearing bore 32. The fast-travel nut 45, which occupies a portion of both the clutch housing bore 31 and the thrust bearing bore 32, has formed on the end opposite the clutch surface 46, a flange portion 38 which resides only in the thrust bearing bore 32. This flange portion 38 serves both to seat the spring 24 on one side and to stop movement of the fast-travel nut 45 at the point shown in FIG. 3 by the thrust washers 35. The fast-travel nut 45 has been further altered by removing the neck-like portion shown in FIG. 1 that extends through the clutch seat member 48. As shown in FIG. 3, the fast-travel nut 45 and clutch seat member 48 only interact at the clutch faces 46 and 47 and do so only during clutch engagement.

As further shown in FIG. 3, the piston 40, hub 41 structures can be virtually identical, thereby reducing manufacture and maintenance operations. The alternate embodiment shown in FIG. 3 further includes a hollow guide rod 34 which is inserted lengthwise through the center of the parking brake device 1. This hollow guide rod 34 extends from the righthandmost end of the cylindrical housing 42, through the center of the Belleville disc spring 43, through the hollow cores 11 of the plurality of piston 40, hub 41 structures, and terminatures upon being threadably engaged to the clutch seat member 48. The portion of the hollow guide rod 34 extending from the righthandmost end to the spring seat member 23 is coaxially surrounded by a spring sleeve 36 which at one end contacts a cap screw 37 which is theadably engaged to the hollow guide rod 34. The cap portion (not shown) of the cap screw 37 can move through the opening formed in the end portion 44 of the cylindrical housing 42.

The operation of the parking brake device 1, shown in FIG. 3, for engaging the parking brake, will be clear to those skilled in the art from the previously described operation of the embodiment shown in FIG. 1.

The operation of the parking brake device 1, shown in FIG. 3, for disengaging the parking brake, differs slightly from that of the embodiment shown in FIG. 1. The operation of pressurizing the pressure chambers 19 to effect movement of the plurality of stacked abutting pistons 17 is the same for both the embodiment of FIG. 1 and of FIG. 3. This serial-type piston operation is a result of a control fluid pressure being introduced to each pressure chamber 19, which causes the piston walls 17 to move rightward thus venting the respective vent chambers 20 and compressing the disc springs. The effect of this serial piston operation is the same in both the FIG. 1 and FIG. 3 embodiments; namely, to sum the forces of each piston wall 17 for a large total piston force. The operation of disengaging the clutch differs slightly in the embodiment of FIG. 3 than that explained for the embodiment of FIG. 1. As shown in FIG. 3, the hollow guide rod 34 is threadably engaged to the clucth seat member 48 at one end and threadably engaged at the opposite end to a cap screw 37. Movement of the plurality of stacked abutting pistons 40 urges the spring seat member 23 to the right, compressing the disc springs 43. The spring sleeve 36, which abuts the spring seat 23, is also urged to the right. As the spring sleeve 36 moves to the right, it contacts the cap screw 37 moving it and the hollow guide rod 34 on which the cap screw 37 is threadably engaged to the right. Movement of the hollow guide rod 34 pulls the clutch seat member 48 away from the fast-travel nut 45 effecting disengagement of the clutch faces 46, 47. The fast-travel nut 45 is then free to rotate subject only to the influence of the spindle 3 which reciprocably moves in an axial manner during service brake operation.

Having now described the invention, what we claim as new and desire to secure by Letters Patent is:

1. A spring-applied, fluid pressure released parking brake device for use on a railway vehicle equipped with a conventional tread brake unit including a brake lever for operating brake shoes, said parking brake device comprising:

(a) a cylindrical housing;
(b) a non-rotating spindle coaxially disposed in said housing and provided with a fast-pitch screw thread, said spindle being connectable to such brake shoe such that when moved axially in a first direction, a brake application occurs, and when moved in a second direction opposite to said first direction, a release of the brake occurs;
(c) a fast-travel nut rotatably carried on said spindle;
(d) a clutch seat member axially slidable in said housing in surrounding relation to said spindle and adjacent said fast-travel nut;
(e) clutch means formed partly on said nut and partly on said clutch seat member, said clutch means being effective, when engaged, for locking said nut in coupled relation with said spindle for causing axial movement of said spindle coincidentally with axial movement of said nut and being effective, when disengaged, for permitting free rotation of said nut to allow axial movement of said spindle independently of said nut;
(f) a plurality of axially aligned, substantially similar, stacked pistons coaxially disposed in said housing in consecutively abutting relation with each other and in abutting contact with said clutch seat member;

(g) pressure chambers formed on one side of each of said stacked pistons and vent chambers formed on the side opposite thereof;

(h) spring means disposed in said housing and acting through said stacked pistons for exerting an axially directed spring force in a direction coinciding with said first direction, on said clutch seat member for causing engagement of the clutch means and consequent movement of said spring in said first direction;

(i) said pistons being subjectable to a control fluid pressure for exerting an axially directed force effecting disengagement of said clutch means, and (j) a hollow guide rod coaxially mounted in said housing and extending through said pistons and threadedly engaged with said clutch seat member, said hollow guide rod being surrounded by a spring sleeve on at least a portion thereof, said spring sleeve being further in contact with a threaded nut which is threadably engaged to said hollow guide rod such that axial movement of said pistons can cause axial movement of said spring sleeve.

2. A parking brake device, as set forth in claim 1, wherein said clutch means comprises an annular conical clutch surface formed on said fast-travel nut in oppositely facing relation to a complementary clutch surface formed on said clutch seat member.

3. A parking brake device, as set forth in claim 2, wherein said pistons include center hollow hub portions forming in effect, a hollow push rod in which a free end of said spindle is reciprocably axially slidable, one end of which push rod adjacent the clutch seat member, makes contact therewith for applying said spring force thereto for effecting engagement of the clutch surfaces.

4. A parking brake device, as set fourth in claim 1, wherein said spring means comprises a plurality of Belleville-type springs coaxially disposed in a spring housing portion formed at one end of said housing opposite the end at which said spindle is connectable to the brake shoe, said springs being arranged in abutting consecutive stacked relation.

5. A parking brake device, as set forth in claim 4, further including an annular spring seat member coaxially disposed in said housing between said plurality of pistons and said plurality of springs, in abutting contact therewith on opposite sides of the spring seat member for transmitting said spring force from the springs to the pistons.

6. A parking brake device, as set forth in claim 1, wherein said cylindrical housing has a front housing portion in which is located a thrust bearing portion and a clutch housing portion formed adjacent each other and separated by a thrust bearing shoulder formed therebetween.

* * * * *